(12) United States Patent
Dewberry et al.

(10) Patent No.: US 7,543,796 B2
(45) Date of Patent: Jun. 9, 2009

(54) HIGH FLOW CALIBRATION TEST POINT

(75) Inventors: James T. Dewberry, Greer, SC (US);
Robert N. Scharpf, Greer, SC (US);
John A. Crispin, Lyman, SC (US)

(73) Assignee: Wabtec Holding Corporation,
Wilmerding, PA (US)

( * ) Notice: Subject to any disclaimer, the term of this patent is extended or adjusted under 35 U.S.C. 154(b) by 341 days.

(21) Appl. No.: 11/486,560

(22) Filed: Jul. 14, 2006

(65) Prior Publication Data
US 2008/0121291 A1   May 29, 2008

(51) Int. Cl.
*F16L 37/28* (2006.01)
(52) U.S. Cl. ............................... 251/149.6; 137/625.48; 137/871
(58) Field of Classification Search ............... 251/149.6; 137/557, 625.4, 871, 625.48; 73/39, 40, 73/121, 129, 756; 303/85, 20, 15, 29; 702/114, 702/45, 51; 700/282; 246/169 R, 182 B, 246/189
See application file for complete search history.

(56) References Cited

U.S. PATENT DOCUMENTS

| | | | |
|---|---|---|---|
| 1,451,644 A | 4/1923 | Zachery | |
| 2,316,217 A | 4/1943 | Birch | |
| 2,993,199 A | 7/1961 | Browne et al. | |
| 3,049,148 A * | 8/1962 | Richardson | 137/625.4 |
| 3,304,420 A | 2/1967 | Bowman | |
| 3,531,981 A | 10/1970 | Pommer | |
| 3,596,500 A | 8/1971 | Rees | |
| 3,799,107 A | 3/1974 | Sumner | |
| 3,817,282 A * | 6/1974 | Peters | 137/607 |
| 3,987,817 A * | 10/1976 | Peters | 137/625.4 |
| 4,050,298 A | 9/1977 | Hope et al. | |
| 4,361,362 A | 11/1982 | Fauck | |
| 4,510,970 A * | 4/1985 | Young | 137/625.4 |
| 5,606,988 A * | 3/1997 | Pawlowski, Jr. | 137/68.14 |
| 5,668,314 A | 9/1997 | Jones | |
| 2006/0118747 A1* | 6/2006 | Cardon | 251/129.15 |
| 2007/0215219 A1* | 9/2007 | Dewberry et al. | 137/557 |

FOREIGN PATENT DOCUMENTS

| | | |
|---|---|---|
| DE | 2036161 A1 | 1/1972 |
| DE | 2815931 A1 | 10/1979 |
| EP | 0032529 A | 7/1981 |

* cited by examiner

*Primary Examiner*—John K Fristoe, Jr.
*Assistant Examiner*—Marina Tiet Jen
(74) *Attorney, Agent, or Firm*—The Webb Law Firm

(57) ABSTRACT

A high flow calibration test point has entry, inlet, and outlet ports and a spring-biased plunger that in one position provides communication between the entry port and both the inlet and outlet ports, in another position provides communication between the entry port only with the outlet port, and in yet another position allows communication only between the inlet and outlet ports.

3 Claims, 4 Drawing Sheets

HIGH FLOW CALIBRATION TEST POINT

BACKGROUND OF THE INVENTION

1. Field of the Invention

This invention relates to an apparatus used for testing and calibrating pneumatic systems, such as the air brakes on a railway vehicle. In particular, this invention relates to a test point which is connected into the pneumatic system requiring testing and calibration.

2. Description of Related Art

Generally speaking, test points are known for use with pneumatic and hydraulic systems. They enable temporary connection of expensive pressure sensors or meters into critical locations in the system for the analysis of problems within the system. When the testing is completed, the sensor can be removed for use elsewhere and the pneumatic system will be as secure as if it had no test point. The high flow test point to be described herein permits not only connection of sensors but calibration by the injection of controlled fluid pressure into an isolated portion of the system. The test point, according to this invention, has particular application with the variable load valves in the brake system of a railway transit vehicle.

SUMMARY OF THE INVENTION

Briefly, according to this invention, a high flow calibration test point comprises a body defining a transfer chamber having a fluid inlet port and a fluid outlet port. Also within the body and connected to the transfer chamber is a plunger cylinder extending between the transfer chamber and the axial end of the body.

A plunger is slidably positioned in the plunger cylinder. The plunger has an entry port at one axial end accessible from the outside of the body. An axial passage extends at least partially through the plunger from the entry port. The plunger has a radial passage in communication with the axial passage and with the exterior cylindrical surface of the plunger. In one position of the plunger, the radial passage is sealed from the transfer chamber and in another position it is in communication with the transfer chamber. A spring is positioned in the transfer chamber for biasing the plunger such that the entry port and radial passage in the plunger are sealed from the transfer chamber.

The fluid inlet port of the transfer chamber is axially aligned with the plunger and defines a valve seat. The plunger has a valve stopper associated therewith. When the plunger is fully depressed against the spring, the stopper is seated and the radial passage in the plunger opens into the transfer chamber. In this position, the entry port in the plunger is in communication only with the outlet port of the transfer chamber. The plunger has an intermediate position where the valve stopper is not seated and the radial passage is still in communication with the transfer chamber. In this position, the entry port is in communication with both the inlet and outlet ports.

Preferably, according to this invention, the body comprises an inner body and an outer body held together by a snap ring. The outer body defines the plunger cylinder and the inner body defines the inlet and outlet ports. The inner and outer bodies together define and enclose the transfer chamber.

According to one embodiment, the plunger has an enlarged end for preventing the plunger from sliding completely through the plunger cylinder. The body comprised of inner and outer bodies enables the assembly of the plunger and spring into the transfer chamber.

According to one embodiment, the plunger in the plunger cylinder does not extend entirely through the body. The portion of the plunger cylinder adjacent the exterior of the body is threaded to accept a threaded plug or probe.

According to a preferred embodiment, a polymeric stopper disc engages the plunger and portions of the cylinder transfer chamber walls. The stopper disc has opposed faces, one of which seals the plunger cylinder from the transfer chamber and the other of which seals the inlet port from the transfer chamber depending upon the position of the plunger.

BRIEF DESCRIPTION OF THE DRAWINGS

Further features and other objects and advantages will become clear from the following detailed description made with reference to the drawings in which:

FIGS. 3 to 6 are drawings of the inner body defining a lower valve seat wherein FIG. 3 is a section view,
FIG. 4 is a side view,
FIG. 5 is a top view, and
FIG. 6 is a bottom view;

FIGS. 7 to 10 are drawings of the outer body defining the upper valve seat wherein FIG. 7 is a section view,
FIG. 8 is a side view,
FIG. 9 is a top view, and
FIG. 10 is a bottom view;

FIGS. 11 to 14 are drawings of the plunger wherein

FIG. 11 is a section view,
FIG. 12 is a side view,
FIG. 13 is a top view,
and
FIG. 14 is a bottom view.

DESCRIPTION OF THE PREFERRED EMBODIMENTS

Figure 1:
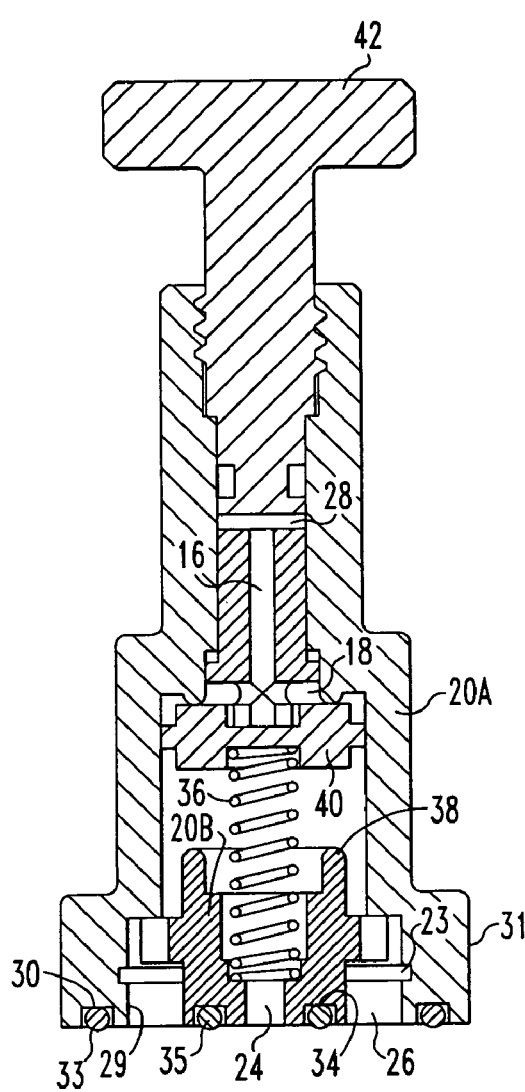
FIG. 1 is a cross section through a test point, according to this invention, in the stowed position.
Figure 2:
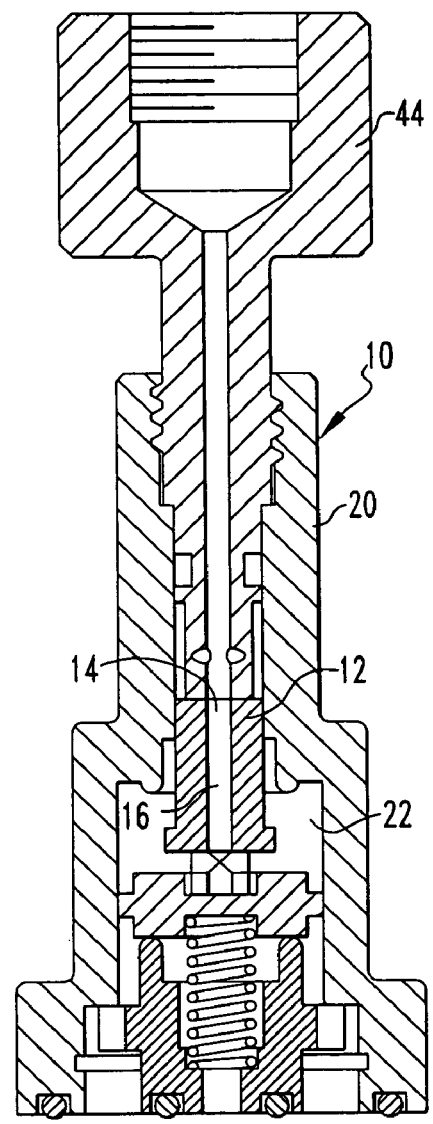
FIG. 2 is a cross section through a test point, according to this invention, in one of the testing positions.
Figure 5:
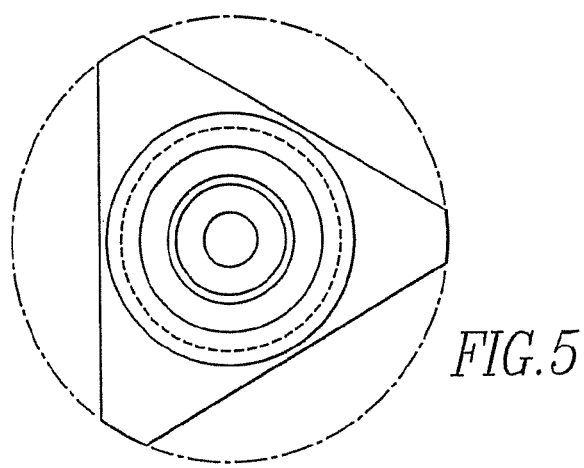
Figure 4:
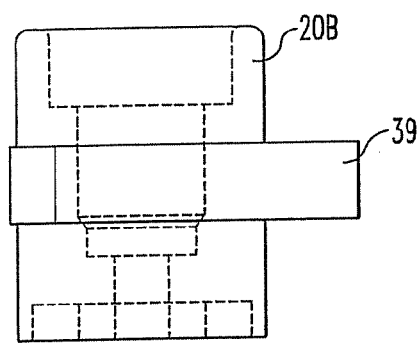
Figure 3:
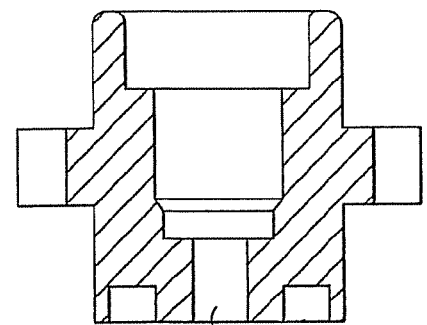
Figure 6:
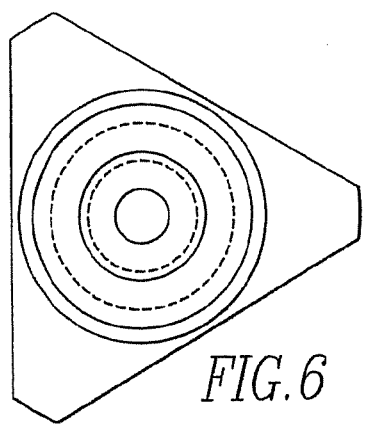
Figure 9:
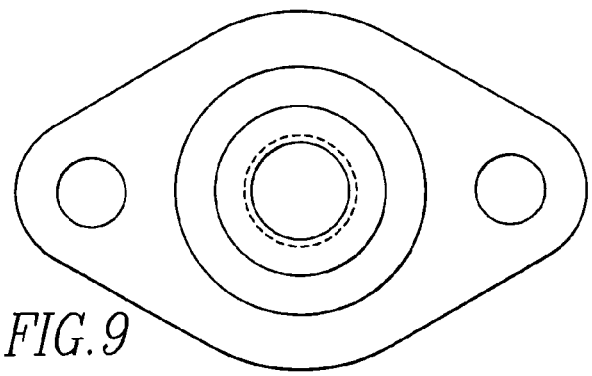
Figure 7:
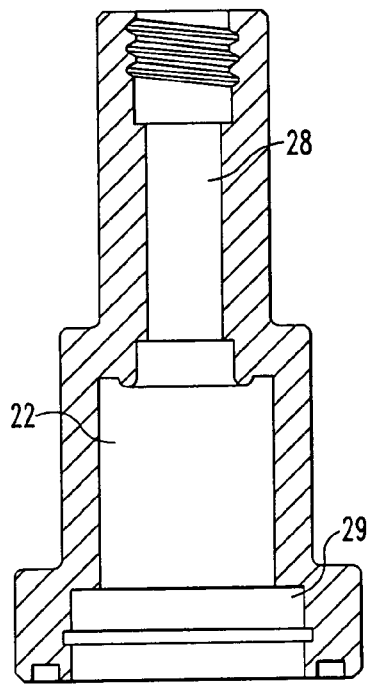
Figure 8:
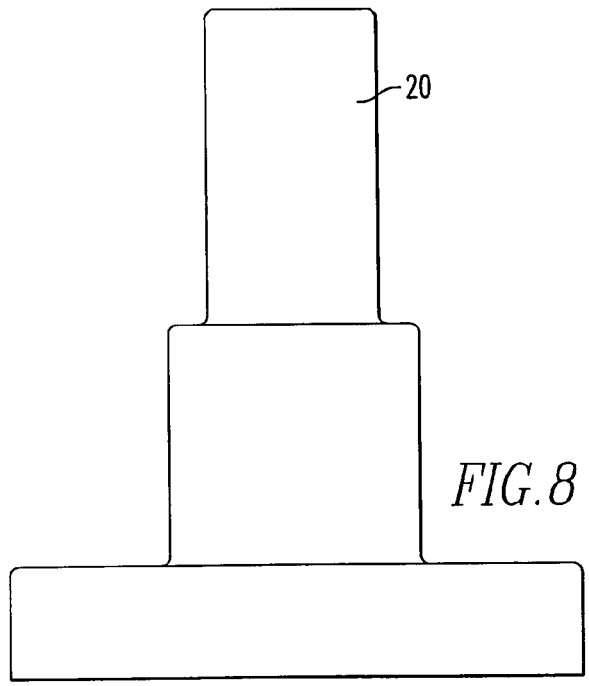
Figure 10:
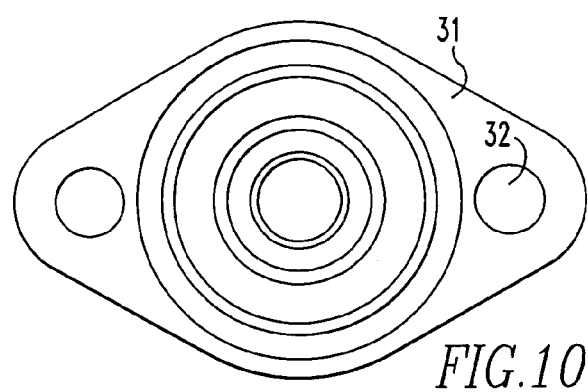
Figure 13:
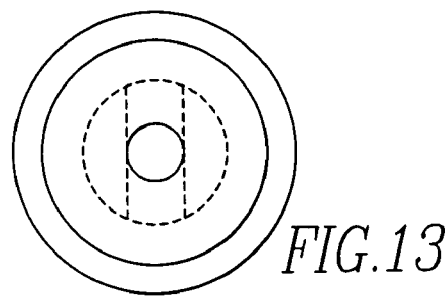
Figure 12:
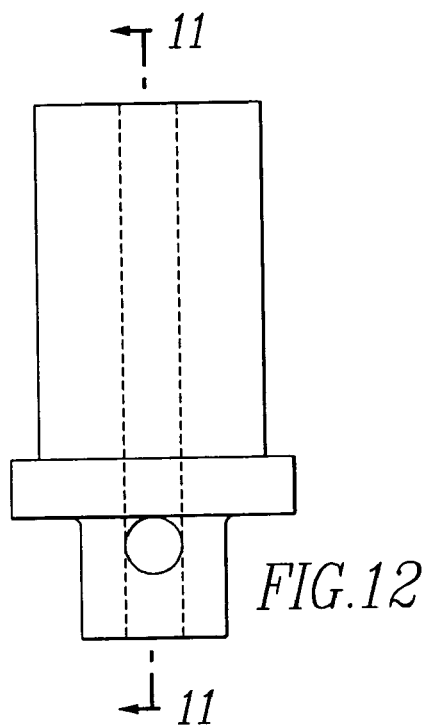
Figure 11:
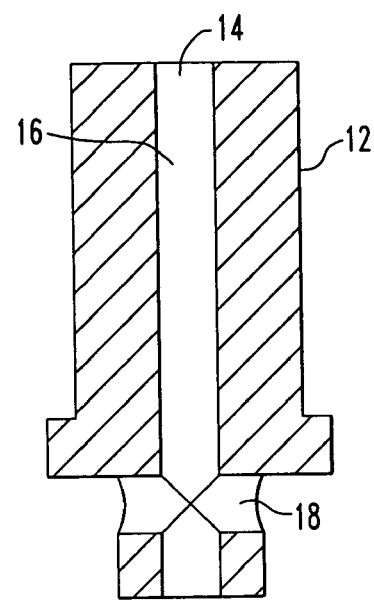
Figure 14:
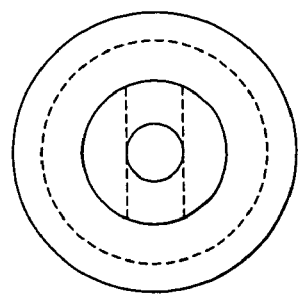

Referring to FIGS. 1 and 2, the test point 10 has a spring biased plunger 12 with an entry port 14 and axial passage 16 therein. The test point comprises a body 20 defining a transfer chamber 22 having a fluid inlet port 24 and a fluid outlet port 26 and defining a plunger cylinder 28. The body is comprised of outer body 20A and inner body 20B joined together by snap ring 23.

The detailed configuration of the outer body 20A is illustrated in FIGS. 7 to 10. The outer body 20A has a hollow cylindrical shape having multiple interior diameters, one of which defines the plunger cylinder 28 and another which defines a transfer chamber 22. At the end of the transfer chamber, a recess 29 is provided for receipt of the inner body 20B. An annular groove 30 is provided for receipt of a sealing O-ring 33. The outer body at the enlarged end has a flange 31 with holes 32 for receiving fasteners for securing outer body to the portion of a pneumatic system to be tested.

The detailed configuration of the inner body 20B is illustrated in FIGS. 3 to 6. The inner body has a hollow cylindrical shape. The interior hollow space defines the inlet port 24 to the test point. At one axial end, an annular groove is provided for receipt of sealing O-rings 34 and 35. The inner body 20B has a radial flange 39 which extends outward with a surface for engaging and being restrained by a surface on the interior of the outer body 20A to restrict the axial movement into the recess 29 of the outer body 20A. A snap ring 23 on the other side of the flange captures the flange and, therefore, the inner body 20B in the outer body 20A. The flange 39, as shown FIGS. 5 and 6, has a triangular shape so that fluid can pass in the axial direction in the annular space between the exterior of the inner body and the interior of the outer body. This annular space defines an outlet port 26 for the test point. As can be seen from FIGS. 1 and 2, the cylindrical portions of the inner and outer bodies have a common cylindrical axis.

The plunger 12 is slidably positioned in the plunger cylinder of the outer body 20A. The detailed configuration of the plunger 12 is shown in FIGS. 11 to 14. The plunger has an entry port 14 at an open axial end and an axial passage 16 extending at least partially through the plunger from the entry port 14. The plunger 12 has a radial passage 18 in communication with the axial passage 16 and with the exterior cylindrical surface of the plunger.

Figure 15:
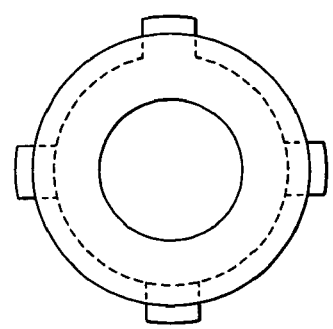
FIG. 15 is a top view of the plunger seal.

The end of the plunger 12 near the radial passage 18 is seated in a valve stopper disc 40. The disc has two opposed axial face surfaces, both of which act with seats to stop flow as will be explained. The circumference of the valve stopper disc, as shown in FIG. 15, is configured to allow flow between the disc and the inner wall of the transfer chamber 22.

A spring 36 seated at one end in the inner body and at the other end in the valve stopper disc 40 biases the plunger and the valve stopper disc away from inner body 20B. In the position where the spring 36 is fully expanded the upper face of the valve stopper disc 40 seals on outer body 20A.

When the plunger is partially pressed against the stopper disc 40, the radial passage 18 in the plunger 12 opens into the transfer chamber 22. If the plunger is fully pressed, the bottom surface of the valve stopper disc 40 seats on the inner body 20B sealing the inlet port 24 and in which position the entry port 14 on the plunger is in communication only with the outlet port 26.

In one application of the high flow test point, the inlet port 24 is connected to a source of control pressure and the outlet port 26 is connected to the load control chamber of variable load relay valve used in pneumatic braking systems in rail vehicles. For an explanation of such application, reference is made to co-pending application Ser. No. 11/378,975, assigned to the same assignee as this application, and entitled "Variable Load Valve With Integral Test Point."

The plunger 12 has an intermediate position where the valve stopper disc is not seated and the radial passage 18 is in communication with the transfer chamber 22 and in which position the entry port of the plunger 12 is in communication with both the inlet port 24 and the outlet 26 port.

In the mode where no testing or calibration is taking place, fluid enters the base through inlet port 24 and flows into the transfer chamber 22 and outlet port 26. The plunger 12 is held by the spring 36 into the plunger cylinder 28 preventing flow into the radial passage 18 and the axial passage 16 in the plunger 12.

For the purposes of calibration, a controlled pressure must be delivered to the device to be calibrated. The cover 42 (see FIG. 1) must be removed and replaced with a probe 44 (see FIG. 2). Probe 44 forces the plunger 12 to seat the stopper, thus sealing the inlet port 24. In this mode, controlled fluid can be injected into the outlet port 26 without affecting the portions of the pneumatic system upstream of the device.

For purposes of monitoring the pneumatic system, the probe 44 is not forced entirely down, leaving the stopper unseated. In this mode, the pressure at the input of the pneumatic device being tested can be observed during operation without disturbing flow.

The high flow calibration test point described herein is designed to go between a fluid source and any device which requires calibration by injection of a controlled fluid pressure. Current devices provide this function, but they restrict flow through the test point. This restriction in flow can impact the operation on the device downstream from the test point. The high flow calibration test point provides a higher flow rate of fluid through the test point than current designs while maintaining leakage protection.

Having thus described the invention in the detail and particularity required by the Patent Laws, what is desired protected by Letters Patent is set forth in the following claims.

The invention claimed is:

1. A high flow calibration test point comprising:
   a body defining a transfer chamber having a fluid inlet port and a fluid outlet port and defining a plunger cylinder in communication with the transfer chamber and test point port said body comprises inner and outer bodies, the outer body defining the plunger cylinder and the inner body defining the inlet and outlet ports of the transfer chamber and the inner and outer bodies together defining the transfer chamber;
   a plunger slidably positioned in the plunger cylinder, said plunger having an entry port at an open axial end, and an axial passage extending at least partially through the plunger from the entry port, said plunger having radial passages in communication with the exterior cylindrical surface of the plunger;
   a spring in the transfer chamber for biasing the plunger away from the transfer chamber such that the radial passages in the plunger are blocked from the transfer chamber;
   said fluid inlet port being axially aligned with the plunger and defining a valve seat;
   said plunger having a polymeric stopper at one end thereof for being seated in said valve seat at the inlet port when the plunger is depressed against the spring and the radial passages in the plunger open into the transfer chamber in which position the entry port in the plunger is in communication only with the outlet port of the transfer chamber, said polymeric stopper having opposed faces, one of which is positionable to seal the plunger cylinder from the transfer chamber and the other of which is positionable to seal the inlet port from the transfer chamber depending upon the position of the plunger; and
   said plunger having an intermediate position where the polymeric stopper is not seated and the radial passages are in communication with the transfer chamber in which position the entry port in the plunger is in communication with both the inlet and outlet ports of the transfer chamber.

2. The test point according to claim 1, wherein the plunger has an enlarged end for securing one end of the spring and for preventing the plunger from sliding too far out of the transfer chamber.

3. The test point according to claim 1, wherein the inner body is positioned axially aligned within the outer body and is held in place by a snap ring.

* * * * *